Patented Sept. 4, 1951

2,566,723

UNITED STATES PATENT OFFICE 2,566,723

8-HYDROXY-1-METHYL-1,2,3,4-TETRAHYDROQUINOLINE DIMETHYL URETHANES

John H. Gardner, Wilson Borough, and Joseph R. Stevens, Easton, Pa., assignors to J. T. Baker Chemical Co., Phillipsburg, N. J., a corporation of New Jersey No Drawing. Application June 25, 1947,
Serial No. 757,068

2 Claims. (Cl. 260—286)

This invention relates to new chemical compounds which have pronounced physiological activity of the nature of that of physostigmine, and are useful therapeutically.

The new compounds of the invention are derivatives of 1,2,3,4-tetrahydro-8-hydroxyquinoline, and more specifically are dimethyl urethans of a quaternary ammonium derivative of this compound. They may be represented by the formula

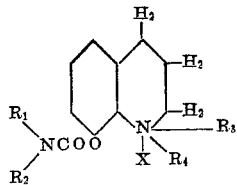

in which $R_1$, $R_2$, $R_3$ and $R_4$ are methyl, and in which X represents an anion, usually a halogen.

The dimethyl urethans may be prepared by the reaction of a dimethyl carbamyl halide with 1-methyl, 1,2,3,4-tetrahydro-8-hydroxyquinoline, followed by alkylation of the resulting ester, in accordance with the following equations in which $R_1$, $R_2$, $R_3$ and $R_4$ are methyl:

(1) 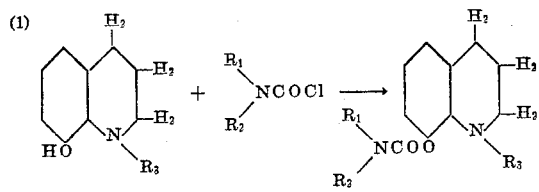

(2) 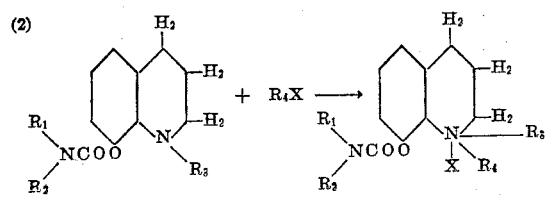

The compounds of the invention may be in the form of their salts as where X in the foregoing formula is a halogen, i. e., iodine, bromine or chlorine, or the anion of another mineral acid, such as sulfuric, methosulfuric, or phosphoric acid, or in the form of the free base. For therapeutic purposes, the compound will ordinarily be used in the form of a salt, in particular, the iodide.

The preparation of the compounds of the invention will be illustrated by the following example, describing the preparation of the dimethyl urethan of 8-hydroxy-1-methyl-1,2,3,4-tetrahydroquinoline methiodide.

Example

The starting material for the production of this compound is 1-methyl-1,2,3,4-tetrahydro-8-hydroxyquinoline, which may be prepared by the methylation of the corresponding 8-hydroxy-1,2,3,4-tetrahydroquinoline by the method of Fischer, Berichte, 16, 714 (1883), that is, by the use of methyl iodide. The 8-hydroxyl-1,2,3,4-tetrahydroquinoline may be prepared by reduction of 8-hydroxyquinoline by the use of tin and hydrochloric acid as described by Bedall et al., Berichte, 14, 1368 (1881).

To prepare the dimethyl urethan of the 8-hydroxy-1-methyl-1,2,3,4-tetrahydroquinoline, a solution of 5 grams of the 8-hydroxy-1-methyl-1,2,3,4-tetrahydroquinoline and 5 ml. of dimethyl carbamyl chloride in 15 ml. of dry pyridine is heated on a steam bath for 24 hours. The reaction mixture is then poured into water and 10% sodium hydroxide added until the mixture is alkaline to phenolphthalein. 20 ml. of 2% of the sodium hydroxide solution is then added, the mixture is extracted three times with ether and the combined ether extracts washed twice with water. The ether is then distilled off and the residue dried by heating on a boiling water bath under 2 mm. pressure. The residue is then dissolved in anhydrous ether and precipitated as the hydrochloride by saturating the solution with hydrogen chloride gas. It may be purified by dissolving it in absolute alcohol and precipitating it with anhydrous ether. This product is the dimethyl urethan of 8-hydroxy-1-methyl-1,2,3,4-tetrahydroquinoline hydrochloride. To convert it to the quaternary ammonium salt, it is converted to the free base, by dissolving it in water, adding ammonia to liberate the base and extracting with ether. The ether extracts are combined, washed with water and the ether removed by distillation. The residue is then dried, dissolved in acetone and an excess of methyl iodide added. The mixture is allowed to stand for two days, after which the crystals which form are filtered out, dried, treated with boiling acetone to dissolve impurities, and the mixture cooled and filtered. The product is purified by crystallization from absolute alcohol. It melts at 153.5 to 154° C., and has pronounced physostigmine activity.

We claim:
1. Compounds of the formula

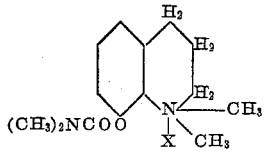

in which X is an anion.

2. 8 - hydroxy - 1 - methyl - 1,2,3,4 - tetrahydroquinoline dimethyl urethan methiodide.

JOHN H. GARDNER.
JOSEPH R. STEVENS.

REFERENCES CITED

The following references are of record in the file of this patent:

UNITED STATES PATENTS

| Number | Name | Date |
|---|---|---|
| 2,364,347 | Dickey et al. | Dec. 5, 1944 |

OTHER REFERENCES

Haworth et al., J. Chem. Soc. (London), Feb. 1947, pp. 182–191.